US012589392B2

(12) United States Patent
Han et al.

(10) Patent No.: US 12,589,392 B2
(45) Date of Patent: Mar. 31, 2026

(54) PATTERN ELECTRODE STRUCTURE FOR ELECTROWETTING DEVICE

(71) Applicants: HYUNDAI MOTOR COMPANY, Seoul (KR); KIA CORPORATION, Seoul (KR); SL CORPORATION, Daegu (KR)

(72) Inventors: Kwang-Joon Han, Seongnam-si (KR); Yu-Bin Jeon, Busan (KR); Byung-Kyu Cho, Hwaseong-si (KR); Sung-Hun Han, Gyeongsan-si (KR); Hong-Jun Cha, Gyeongsan-si (KR); Young-Ern Jung, Daegu (KR)

(73) Assignees: HYUNDAI MOTOR COMPANY, Seoul (KR); KIA CORPORATION, Seoul (KR); SL CORPORATION, Daegu (KR)

( * ) Notice: Subject to any disclaimer, the term of this patent is extended or adjusted under 35 U.S.C. 154(b) by 169 days.

(21) Appl. No.: 18/381,875

(22) Filed: Oct. 19, 2023

(65) Prior Publication Data

US 2025/0050336 A1 Feb. 13, 2025

(30) Foreign Application Priority Data

Aug. 8, 2023 (KR) ........................ 10-2023-0103236

(51) Int. Cl.
*B01L 3/00* (2006.01)

(52) U.S. Cl.
CPC ... *B01L 3/50273* (2013.01); *B01L 2300/0645* (2013.01); *B01L 2300/088* (2013.01);
(Continued)

(58) Field of Classification Search
CPC ........... B01L 3/50273; B01L 3/502792; B01L 2300/0645; B01L 2300/0883;
(Continued)

(56) References Cited

U.S. PATENT DOCUMENTS

| | | | | |
|---|---|---|---|---|
| 11,300,533 | B2 | 4/2022 | Chung et al. | |
| 2014/0251808 | A1 * | 9/2014 | Chung | ............ G01N 27/44721 204/601 |
| 2019/0277787 | A1 | 9/2019 | Chung et al. | |

FOREIGN PATENT DOCUMENTS

| | | | | |
|---|---|---|---|---|
| KR | 2018-0045079 | A | 5/2018 | |
| KR | 102152644 | B1 * | 9/2020 | ......... G02B 27/0006 |

* cited by examiner

*Primary Examiner* — C. Sun
(74) *Attorney, Agent, or Firm* — MCDONNELL BOEHNEN HULBERT & BERGHOFF LLP

(57) ABSTRACT

A pattern electrode structure for an electrowetting device is laminated between a base material and a dielectric layer of the electrowetting device, and the pattern electrode structure includes first branch electrodes formed in a direction perpendicular to any plane perpendicular to a plane defined by the pattern electrode structure, and a basal pattern electrode formed in an area below lower ends of the first branch electrodes and connected to an electrode connection portion configured to receive a voltage, in which a sum of an interval between the first branch electrode and the basal pattern electrode and a width of the basal pattern electrode is larger than a diameter of a droplet to be removed, thereby preventing the droplet from stagnating without falling at the terminal end of the pattern in a structure that uses the vertical pattern.

7 Claims, 31 Drawing Sheets

(52) U.S. Cl.
CPC .................. *B01L 2300/0883* (2013.01); *B01L 2300/0887* (2013.01); *B01L 2300/161* (2013.01); *B01L 2400/0427* (2013.01)

(58) Field of Classification Search
CPC ....... B01L 2300/0887; B01L 2300/161; B01L 2400/0427
See application file for complete search history.

PATTERN ELECTRODE STRUCTURE FOR ELECTROWETTING DEVICE

CROSS REFERENCE TO RELATED APPLICATIONS

This application claims priority to Korean Patent Application No. 10-2023-0103236, filed on Aug. 8, 2023, which is incorporated herein by reference in its entirety.

BACKGROUND

Field of the Disclosure

The present disclosure relates to an electrode structure to which a pattern structure using an electrowetting phenomenon is applied.

Description of Related Art

An electrowetting phenomenon refers to a phenomenon in which a contact angle between a solid and an electrolyte is changed by a potential difference between the solid and the electrolyte.

The use of this phenomenon may control surface tension of a droplet placed on an electrode coated with an insulator, thereby controlling deformation/movement of a micro-fluid of a micro-liter (μl) unit or less.

In addition, a weight of an application product may be reduced because a separate external driver is not required to operate the application product. Electric power consumption is low and a response speed is high because a flow of electric current is restricted by the insulator applied onto the electrode. Therefore, the electrowetting phenomenon is receiving great attention in various industrial fields.

Examples of the use of electrowetting in the industries include next-generation electronic devices such as lab-on-a-chips, fluid lenses, and displays that operate in different ways from the related art.

In addition, an electrowetting apparatus may be used to move, deform, and remove a droplet formed on a glass. Therefore, the electrowetting apparatus may be mounted on a windshield, a side mirror, a camera, or the like of a vehicle to remove rainwater and dewdrops.

The present disclosure relates to a self-cleaning technology using the electrowetting phenomenon.

FIG. 1 illustrates a basic electrowetting self-cleaning apparatus in which an electrode layer 10, a dielectric layer 30, and a water-repellent layer 40 are laminated on a glass 20 which is a base material.

The type of base material 20 is not limited, but a transparent glass may be used so that the base material 20 is mounted on a product such as a camera that transmits visible rays.

The electrode layer 10 is a transparent electrode pattern layer and needs to be positioned at a lower end of the dielectric layer, and the performance of the electrode layer 10 is improved as electrical conductivity increases.

The electrode layer 10 need not be necessarily transparent, but the transparent electrode needs to be used so that the electrode layer 10 is mounted on the product that transmits visible rays. As representative materials, oxide-based ITO, polymer-based PEDOT:PSS, oxide-polymer composites (FTO), and the like may be used.

The performance may be improved as the dielectric layer 30 has a high dielectric constant and a small thickness. The durability and lifespan are improved as the dielectric layer 30 has high dielectric breakdown strength and a small amount of defects. A deviation in performance and durability decreases as the dielectric layer 30 becomes more uniform, more homogeneous, and more continuous.

The dielectric layer 30 may be configured as a single layer or a multi-layer. As representative materials, oxide/nitride-based materials such as $SiO_2$, $TiO_2$, $Al_2O_3$, $CeO_2$, $HfO_2$, $ZrO_2$, ZnO, SiON, and $Si_3N_4$, and polymer-based materials such as Parylene-C, a cyclic olefin polymer (COP), and polymethylmethacrylate (PMMA) may be used. As deposition methods, wet processes (spray, spin-coating, ink-jet, etc.) and dry processes (E-beam, sputtering, CVD, etc.) may be used.

The water-repellent layer 40 is not an essential element and may be omitted if an outermost peripheral layer of the dielectric layer has a sufficiently large contact angle.

A fluorine compound is used as a representative material, and a coating process is performed by a method such as E-beam spin coating.

When a voltage is applied to the transparent electrode on the glass surface of the electrowetting device, a contact angle of a droplet disposed at the periphery of the electrode is changed.

The droplet disposed at the periphery of the electrode may move in response to a change in polarities of the voltage applied to the electrode or oscillate in response to a change in magnitudes of the voltage.

According to the Lippmann-Young equation, the change in contact angle is large when the following three conditions are met.

- Dielectric coating material with high dielectric constant and small thickness
- Hydrophobic coating material with low interfacial tension (=large contact angle)
- High applied voltage The mobility of the droplet on the surface of the electrowetting device varies depending on a frequency and/or magnitude of the applied voltage.

That is, in case that direct current voltages with different polarities are applied to two adjacent electrodes, the droplet is drawn by an attractive force between the electrodes, which have polarities opposite to the polarity of the droplet, as illustrated in FIG. 2, such that the droplet moves.

Further, in case that a half-wave rectified current with a phase difference of 180 degrees is continuously applied to the two adjacent electrodes, the droplet is repeatedly contracted and expanded in opposite polarity directions. Therefore, as illustrated in FIG. 3, oscillation occurs, and an adhesion force to a bottom surface decreases.

That is, when an external force is applied to the droplet, the droplet may easily move in a direction of the external force. (Decrease in Adhesion Force+Gravity=Fall)

FIG. 4 illustrates an example of an electrode pattern structure. The electrode pattern structure includes a first electrode part and a second electrode part. The first electrode part includes a first electrode connection portion 111, a first basal pattern electrode 112, and a first branch electrode 113. The second electrode part includes a second electrode connection portion 121, a second basal pattern electrode 122, and a second branch electrode 123.

In general, by a method of inducing oscillation by applying an alternating current (AC), a droplet on an electrowetting type surface moves in a length direction of a branch electrode by being affected by gravity.

Therefore, a vertical pattern, which may minimize a fall distance and time, is often employed. However, in the case of a structure that uses a comb-shaped vertical pattern while applying an AC voltage, droplets may stagnate without falling any further at a terminal end of the pattern.

The above information disclosed in the related art is only for enhancement of understanding of the background of the present disclosure and therefore it may contain information that does not form the related art that is already known to a person of ordinary skill in the art.

SUMMARY

Accordingly, an object of the present disclosure considering the above point is to provide a pattern electrode structure for an electrowetting device, which is capable of more efficiently exhibiting self-cleaning performance by preventing a droplet from stagnating without falling at a terminal end of a pattern in a structure that uses a vertical pattern.

As a preferred embodiment, a pattern electrode structure for an electrowetting device is laminated between a base material and a dielectric layer of the electrowetting device and includes first branch electrodes formed in a direction perpendicular to any plane perpendicular to a plane defined by the pattern electrode structure, and a basal pattern electrode formed in an area below lower ends of the first branch electrodes and connected to an electrode connection portion configured to receive a voltage, in which a sum of an interval between the first branch electrode and the basal pattern electrode and a width of the basal pattern electrode is larger than a diameter of a droplet to be removed.

In particular, the sum of the interval between the first branch electrode and the basal pattern electrode and the width of the basal pattern electrode may be larger than 1.93 mm.

Further, the first branch electrode and the basal pattern electrode may have different polarities.

Further, the pattern electrode structure may further include second branch electrodes formed alternately with the first branch electrodes in a width direction of the pattern electrode structure and being different in polarities from the first branch electrodes.

Meanwhile, the lower end of the first branch electrode may have a width that decreases toward an end thereof.

Specifically, the lower end of the first branch electrode may include a curved portion.

Alternatively, the lower end of the first branch electrode may include a cutting-edge portion.

Further, the pattern electrode structure may further include a hydrophobic coating layer laminated on the electrode structure, in which the hydrophobic coating layer is partially laminated on the electrode structure.

Specifically, a height of a lower end of the hydrophobic coating layer may be equal to or lower than a height of a lowermost end of the first branch electrode and higher than a point spaced apart downward from the lowermost end of the first branch electrode at a distance corresponding to a radius of the droplet to be removed.

As another preferred embodiment, a pattern electrode structure for an electrowetting device is laminated between a base material and a dielectric layer of the electrowetting device and includes: first branch electrodes formed in a direction perpendicular to any plane perpendicular to a plane defined by the pattern electrode structure; and a basal pattern electrode formed in an area below lower ends of the first branch electrodes and connected to an electrode connection portion configured to receive a voltage, in which the lower end of the first branch electrode has a width that decreases toward an end thereof.

Further, the first branch electrode and the basal pattern electrode may have different polarities.

In addition, the pattern electrode structure may further include second branch electrodes formed alternately with the first branch electrodes in a width direction of the pattern electrode structure and being different in polarities from the first branch electrodes.

Further, the lower end of the first branch electrode may include a curved portion.

Alternatively, the lower end of the first branch electrode may include a cutting-edge portion.

Meanwhile, the pattern electrode structure may further include a hydrophobic coating layer laminated on the electrode structure, in which the hydrophobic coating layer is partially laminated on the electrode structure.

Specifically, a height of a lower end of the hydrophobic coating layer may be equal to or lower than a height of a lowermost end of the first branch electrode and higher than a point spaced apart downward from the lowermost end of the first branch electrode at a distance corresponding to a radius of the droplet to be removed.

In the electrowetting glass, when a droplet stays in a particular narrow space and oscillates in place or moves repeatedly, electric charges and ions are moved in the droplet by a periodic change in voltage, and the electric charges and ions are concentrated at a particular position, which causes a burnout because of an excessive yield voltage of the dielectric layer on the glass surface.

However, according to the present disclosure, the droplet may be guided to the region where a low or no periodic voltage is applied, thereby preventing a burnout of the dielectric layer.

Therefore, according to the present disclosure, it is possible to rapidly improve an operation lifespan of the electrowetting glass.

DETAILED DESCRIPTION

Hereinafter, embodiments of the present disclosure will be described in detail with reference to the exemplary accompanying drawings, and since these embodiments, as examples, may be implemented in various different forms by those skilled in the art to which the present disclosure pertains, they are not limited to the embodiments described herein.

In order to sufficiently understand the present disclosure, advantages in operation of the present disclosure, and the object to be achieved by carrying out the present disclosure, reference needs to be made to the accompanying drawings for illustrating an exemplary embodiment of the present disclosure and contents disclosed in the accompanying drawings.

Further, in the description of the present disclosure, the repetitive descriptions of publicly-known related technologies will be reduced or omitted when it is determined that the descriptions may unnecessarily obscure the subject matter of the present disclosure.

Figure 1:
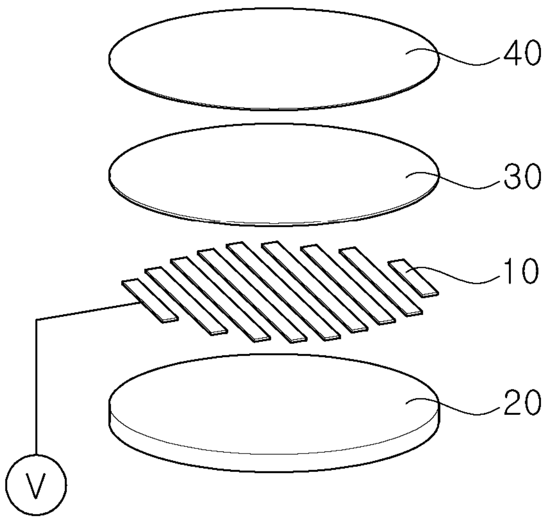
FIG. 1 (Prior Art)
FIGS. 1, 2, and 3 are views for explaining a general electrowetting device.
Figure 2:
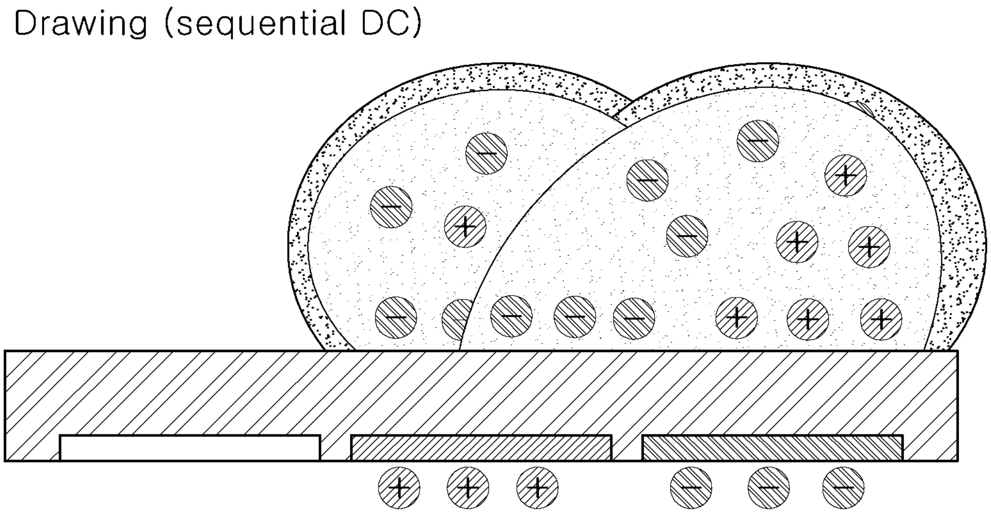
FIG. 2 (Prior Art)
Figure 3:
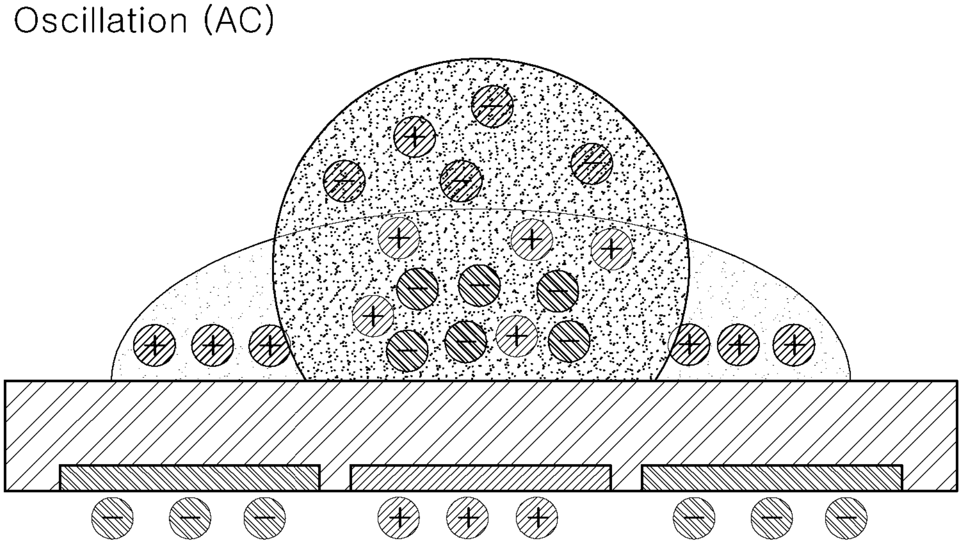
FIG. 3 (Prior Art)
Figure 4:
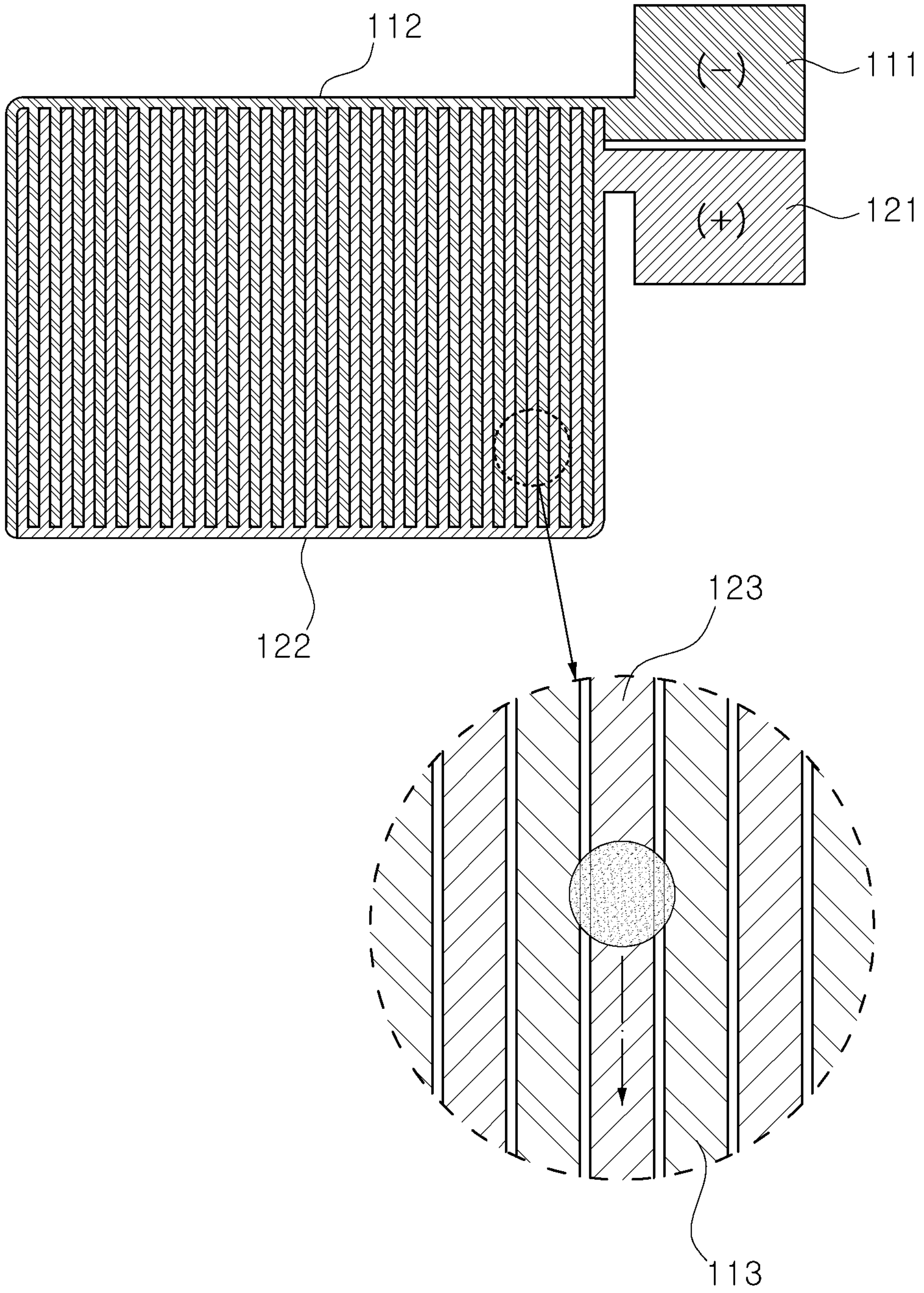
FIG. 4 is a view illustrating a pattern structure of the electrowetting device.

FIG. 4 is a view illustrating a pattern structure of an electrowetting device, and FIGS. 5 to 13 are views for explaining a limitation of a technology according to a pattern structure in the related art.

The present disclosure is to prevent a droplet from stagnating without falling at a terminal end of a vertical pattern in a structure that uses the vertical pattern.

Figure 5:
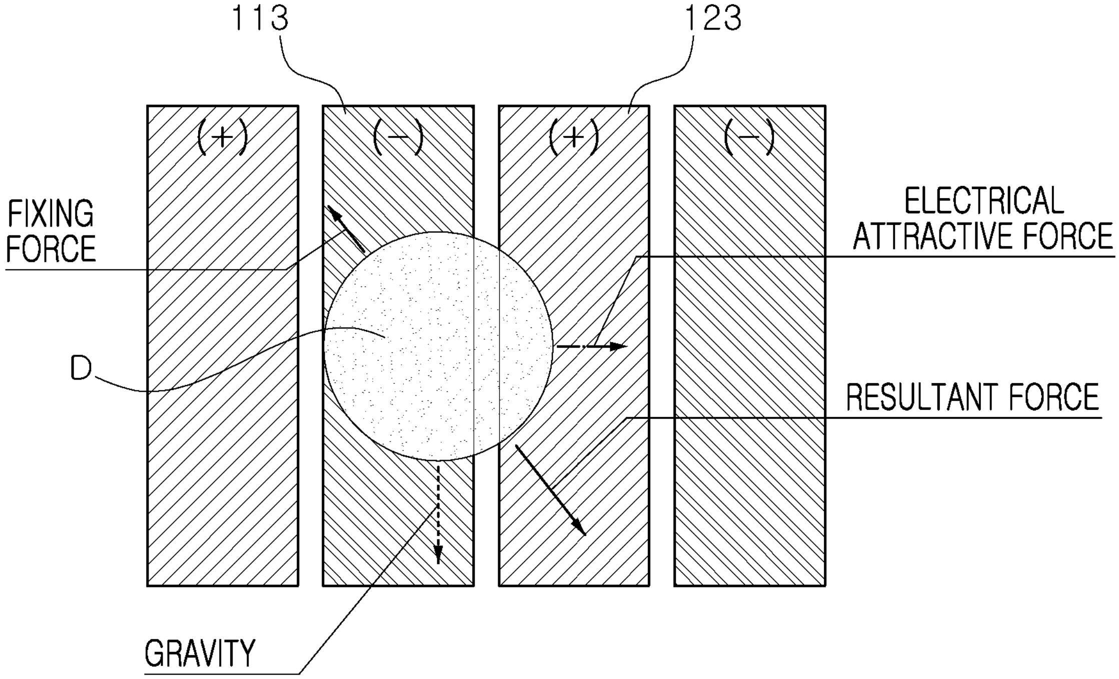
FIG. 5 (Prior Art)
FIGS. 5, 6, 7, 8, 9, 10, 11, 12, and 13 are views for explaining a limitation of a technology according to a pattern structure in the related art.
Figure 6:
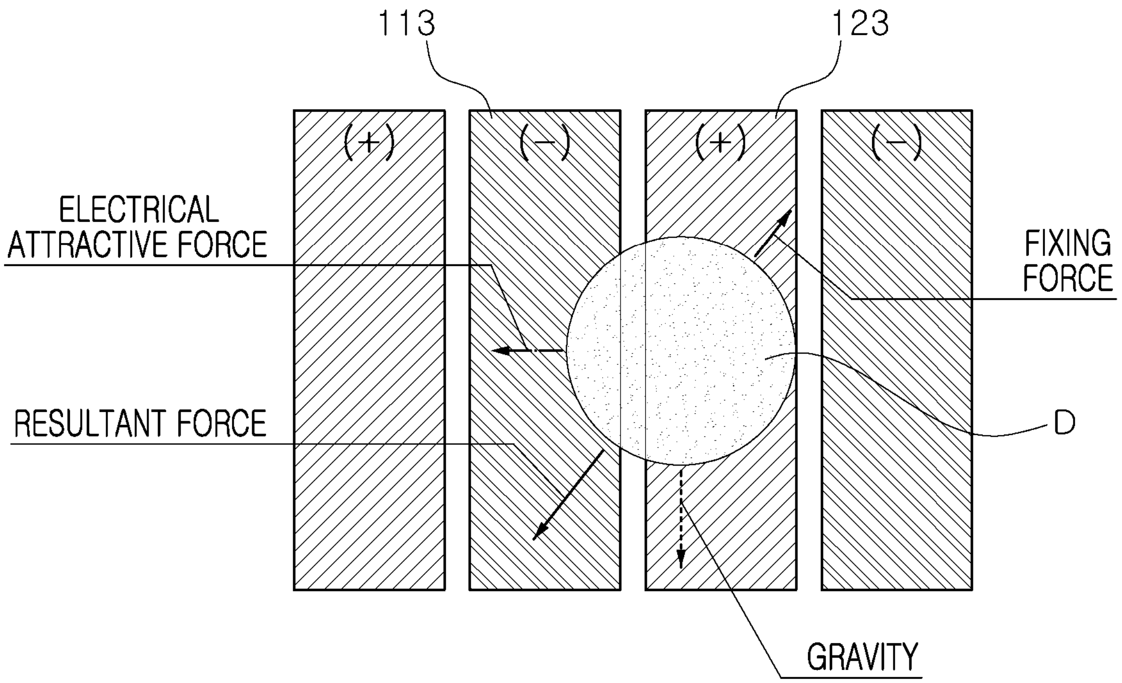
FIG. 6 (Prior Art)
Figure 7:
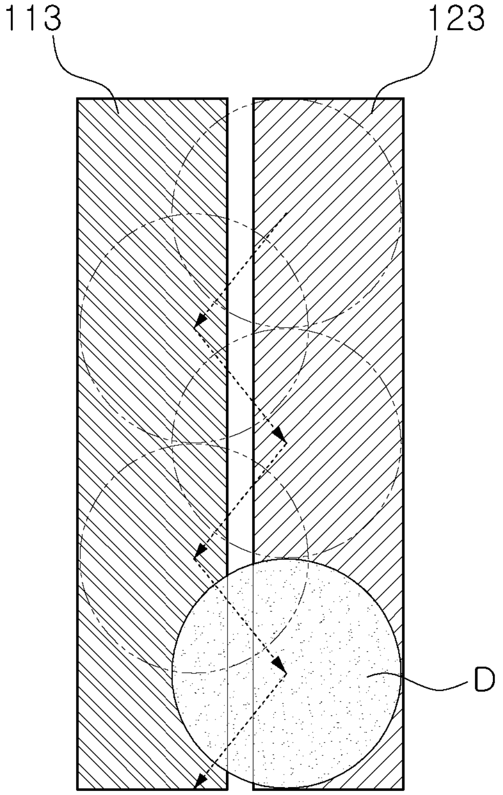
FIG. 7 (Prior Art)

FIGS. 5 to 7 illustrate a case in which a size of a droplet D spans two or fewer electrodes. FIGS. 5 and 6 illustrate that the droplet D spans a first branch electrode 113 and a second branch electrode 123, and an equilibrium relationship between forces is illustrated. FIG. 7 illustrates a motion of the actual droplet D when an alternating current voltage is applied in this situation.

Figure 8:
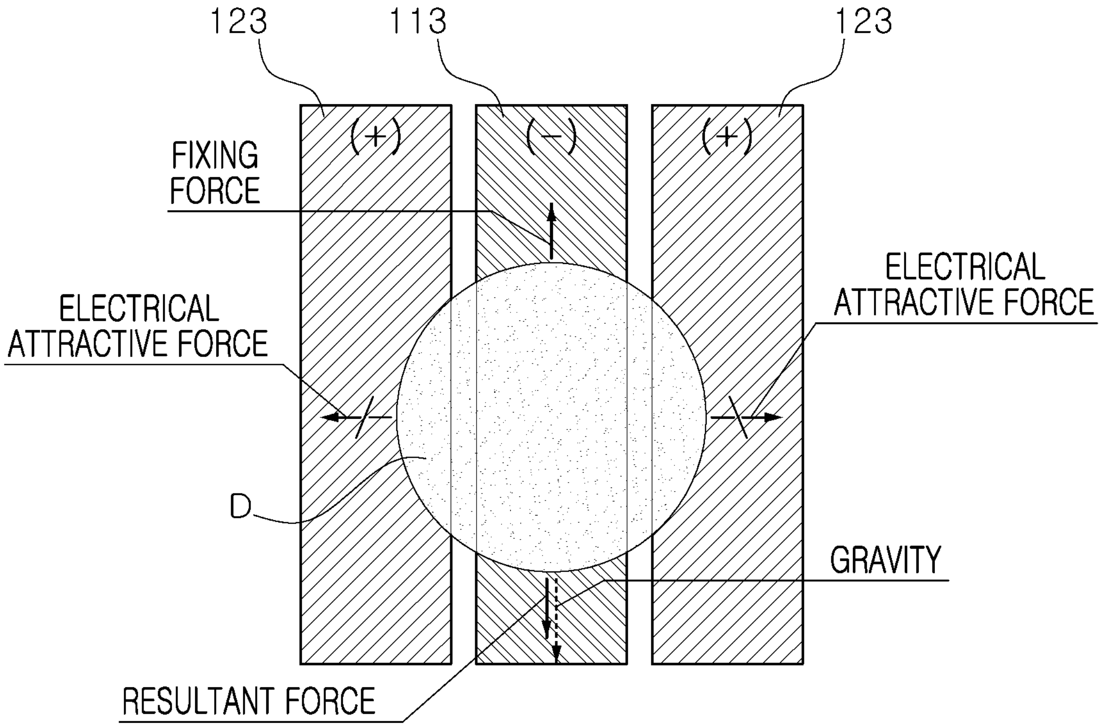
FIG. 8 (Prior Art)
Figure 9:
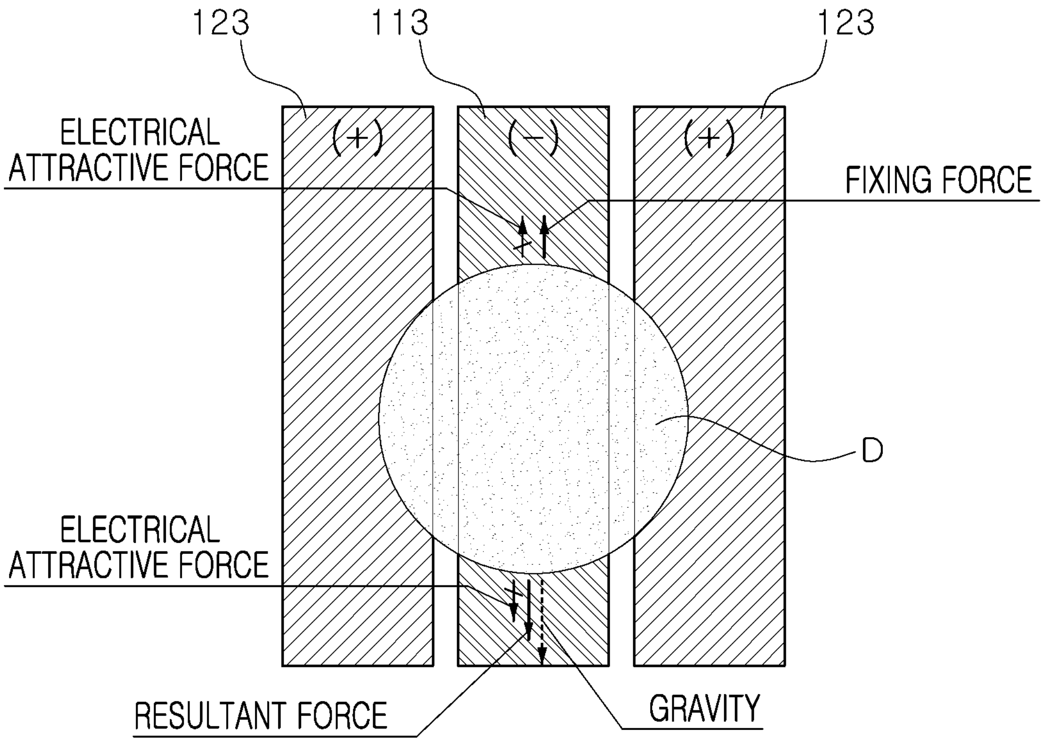
FIG. 9 (Prior Art)
Figure 10:
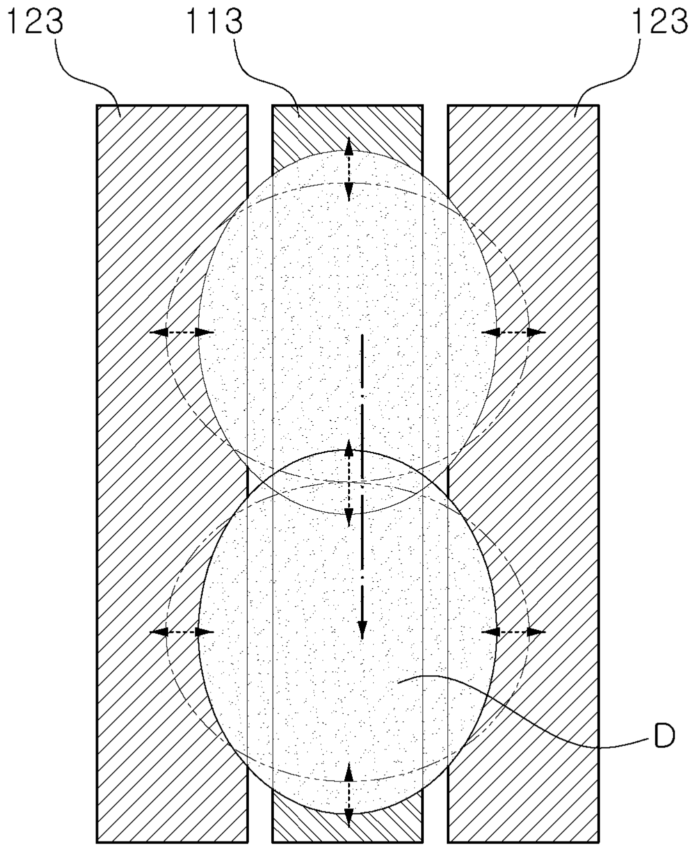
FIG. 10 (Prior Art)

FIGS. 8 to 10 illustrate a case in which a size of the droplet D spans three or more electrodes. FIGS. 8 and 9 illustrate that the droplet D spans the first branch electrode 113 and the second branch electrodes 123 disposed at two opposite sides, and illustrate an equilibrium relationship between forces. FIG. 10 illustrates a motion of the actual droplet D when an alternating current voltage is applied in this situation.

In case that the droplet stays at a particular position over a long period of time without moving as described above, a high potential difference is applied between the droplet and a drive electrode disposed below an insulation layer over a long period of time, and an insulation breakdown of the insulation layer may occur.

The insulation breakdown occurs after occurrence of soot, and leads to growth of separation of insulation layer and overall separation.

An insulation layer with high dielectric breakdown strength may be applied. However, because the dielectric breakdown strength and a dielectric constant are inversely proportional to each other, cleaning performance may significantly deteriorate as the dielectric constant decreases.

Therefore, it is advantageous to prevent the droplet from being stuck at a particular position over a long period of time.

Figure 11:
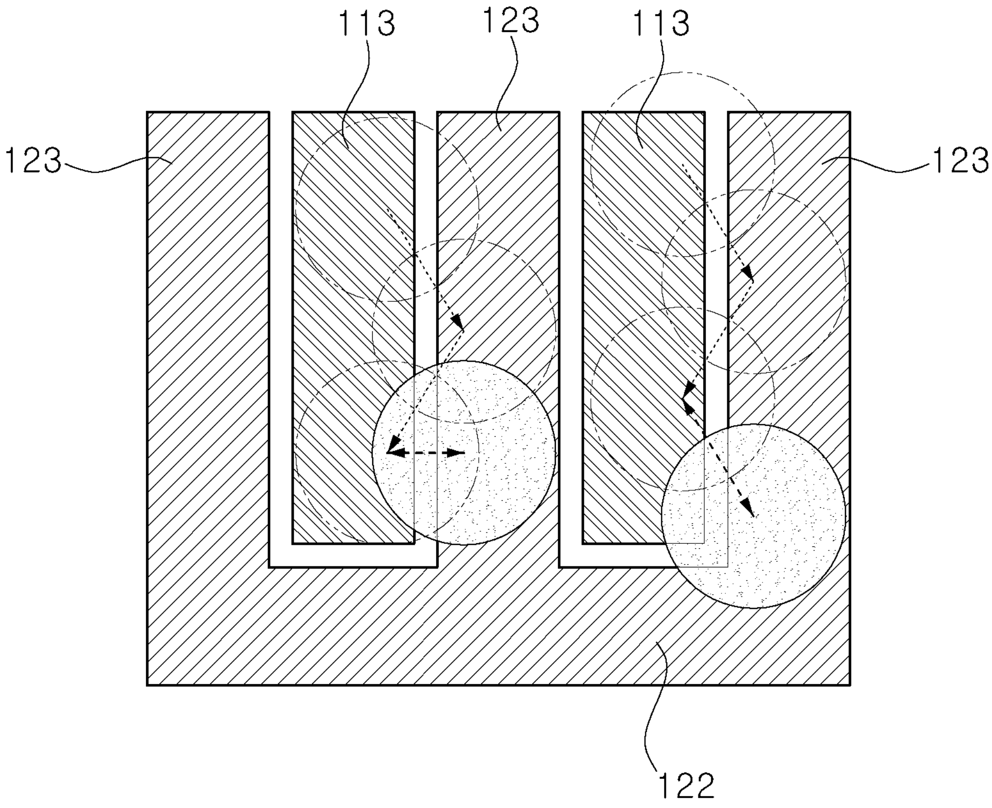
FIG. 11 (Prior Art)
Figure 12:
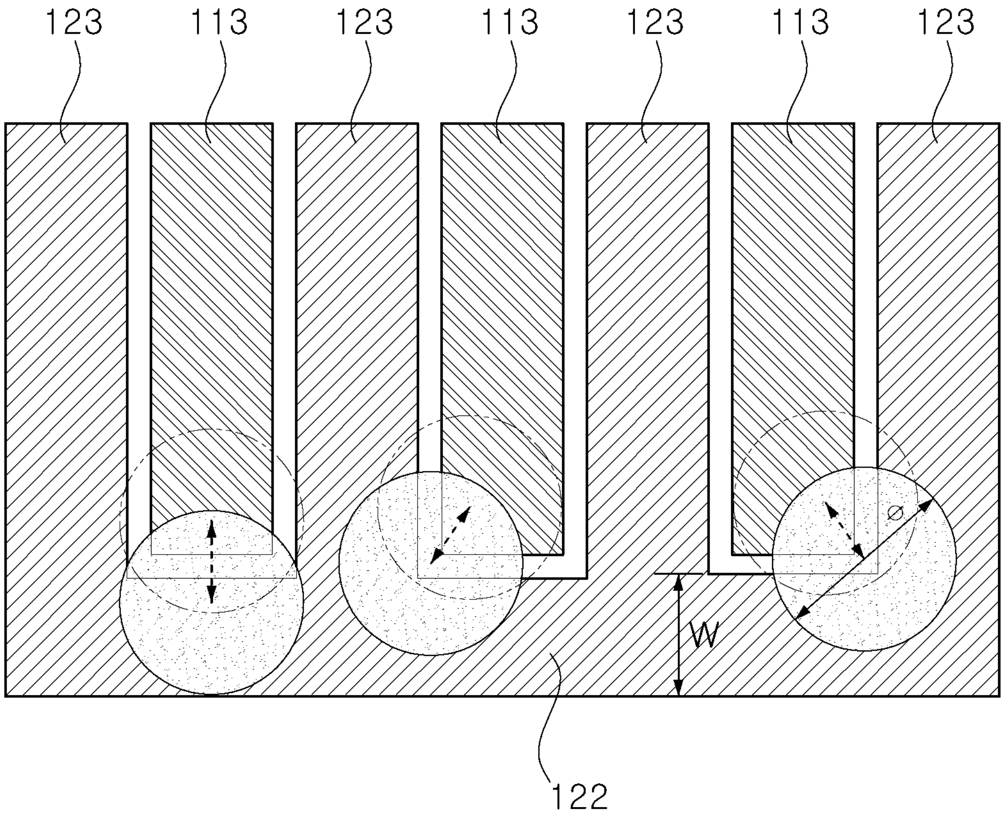
FIG. 12 (Prior Art)

FIGS. 11 and 12 illustrate a situation in which the droplet is stuck without moving.

FIG. 11 illustrates that the droplet D reaches a terminal end, which is a lower end of the first branch electrode 113, the droplet D is stuck at an end position of the first branch electrode 113, and the droplet D repeatedly moves at a fixed position.

FIG. 12 illustrates that the droplet, which spans the end of the first branch electrode 113 is repeatedly moved at a fixed position by polarity switching (alternating current) before the droplet departs from the first branch electrode 113. In case that W (width of lower end electrode)$<\Phi$ (diameter of droplet), an occurrence rate increases.

Figure 13:
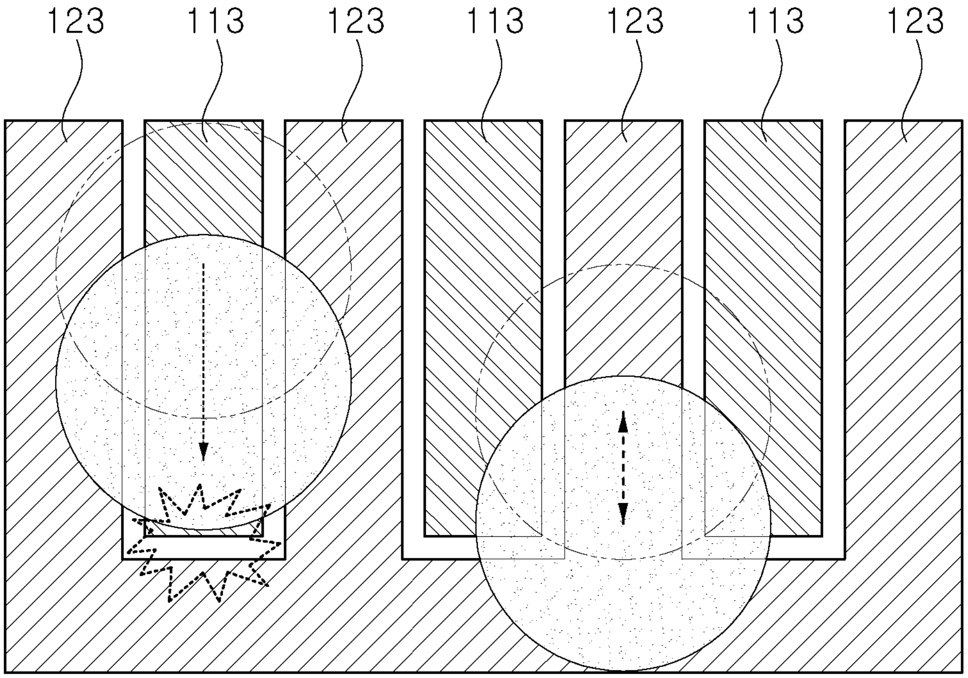
FIG. 13 (Prior Art)

FIG. 13 illustrates a situation in which sizes of droplets span three or more electrodes. The droplet at the left side moves downward along the first branch electrode 113 and is stuck (oscillation in place) at the end position because of the termination of the first branch electrode 113. The droplet at the right side moves downward along the second branch electrode 123 and is repeatedly moved by polarity switching (alternating current) before the droplet departs from the first branch electrode 113. In case that W (width of lower end electrode)$<\Phi$ (diameter of droplet), the occurrence rate increases.

This situation in which the droplet is stuck occurs in case that a droplet spans two electrodes adjacent to each other in an upward/downward direction.

When a voltage is applied to an upper electrode in a state in which the droplet cannot completely depart from the upper electrode (the branch electrode), an electrical attractive force is generated in an upward direction, such that the droplet appears to be repeating in the upward/downward direction, oscillating, or stuck.

The situation in which the droplet is stuck occurred because the droplet cannot completely depart from the upper electrode when the droplet is drawn to the lower electrode. There are three reasons as follows.

1) The droplet cannot depart from the upper electrode even when the droplet is drawn to the lowermost end because of a dimension of the pattern electrode.
2) The droplet cannot be sufficiently pulled downward because of a low electrical attractive force of the lower electrode (a problem with a magnitude of an electrical attractive force).
3) An attractive force of the upper electrode occurs before the droplet departs from the upper electrode by an electrical attractive force of the lower electrode (a problem with applied frequencies).

The present disclosure is to solve the problem with the dimension of the pattern electrode in order to prevent the droplet from being stuck at a terminal end of a branch electrode.

Figure 14:
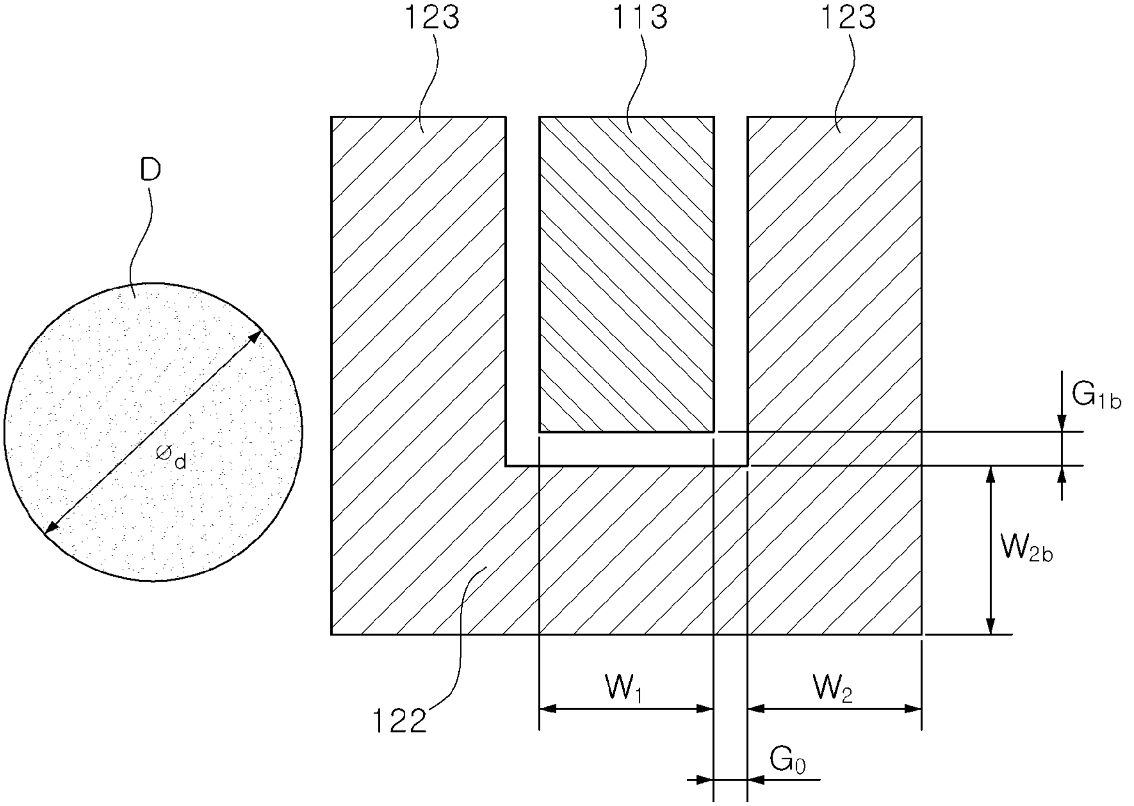
FIG. 14 is a view illustrating a part of a pattern structure of an electrowetting device of the present disclosure.

FIG. 14 is a view illustrating a part of a pattern structure of an electrowetting device of the present disclosure.

Hereinafter, a pattern electrode structure for an electrowetting device according to an embodiment of the present disclosure will be described with reference to FIG. 14.

In an electrowetting self-cleaning device of the present disclosure, the electrode layers 10, a dielectric layer 30, and a water-repellent layer 40 are stacked on a glass 20. The water-repellent layer 40 may be a hydrophobic coating layer.

As illustrated in FIG. 4, a pattern structure of the electrowetting device of the present disclosure includes a first electrode part and a second electrode part. The first electrode part includes a first electrode connection portion 111, a first basal electrode 112, and first branch electrodes 113. The second electrode part includes a second electrode connection portion 121, a second basal electrode 122, and a second branch electrodes 123.

The illustrated pattern structure may have a quadrangular shape, as a whole, but have a circular or elliptical shape, as a whole. That is, the overall shape is irrelevant to the subject matter of the present disclosure.

Further, the pattern electrode structure of the present disclosure performs self-cleaning by oscillating and dropping droplets on the electrode by receiving an alternating current voltage. A plane defined by the entire structure needs to be a plane perpendicular to a horizontal plane or needs to be a plane inclined at a predetermined angle.

The first electrode connection portion 111 and the second electrode connection portion 121 are connected to a power source to receive a voltage. The first basal pattern electrode 112 and the second basal pattern electrode 122 are respectively connected to the first electrode connection portion 111 and the second electrode connection portion 121 and define an outer periphery of the entire pattern electrode structure. That is, a predetermined region of the outer periphery is defined by the first basal pattern electrode 112, and the remaining region of the outer periphery is defined by the second basal pattern electrode 122.

The first branch electrodes 113 and the second branch electrodes 123 respectively branch off from the first basal pattern electrode 112 and the second pattern basal electrode 122 and are disposed on the electrode structure in one direction. One direction is defined as a direction perpendicular to any plane perpendicular to the electrode structure.

Further, the first branch electrodes 113 and the second branch electrodes 123 are arranged alternately in a width direction.

FIG. 14 illustrates a part of the pattern electrode structure of the present disclosure and illustrates a part including a lower end or terminal end of the branch electrode and the basal pattern electrode disposed below the branch electrode.

In this case, a width of the first branch electrode 113 is indicated by $W_1$, a width of the second branch electrode 123 is indicated by $W_2$, and a width of the second basal pattern electrode 122 is indicated by $W_{2b}$.

As illustrated, a width direction of the branch electrode and a width direction of the basal pattern electrode are different from each other.

Further, an interval between the first branch electrode 113 and the second branch electrode 123 is indicated by $G_0$, and an interval between the first branch electrode 113 and the second basal pattern electrode 123 is indicated by $G_{1b}$. A diameter of the droplet D is indicated by $\Phi_d$.

In this case, the present disclosure is characterized in that a sum ($W_{2b}+G_{1b}$) of the width $W_{2b}$ of the second basal pattern electrode 122 and the interval $G_{1b}$ between the first branch electrode 113 and the second basal pattern electrode 122 is larger than the diameter $\Phi_d$ of the droplet to be removed.

$$W_{2b}+G_{1b}>\Phi_d$$

Figure 15:
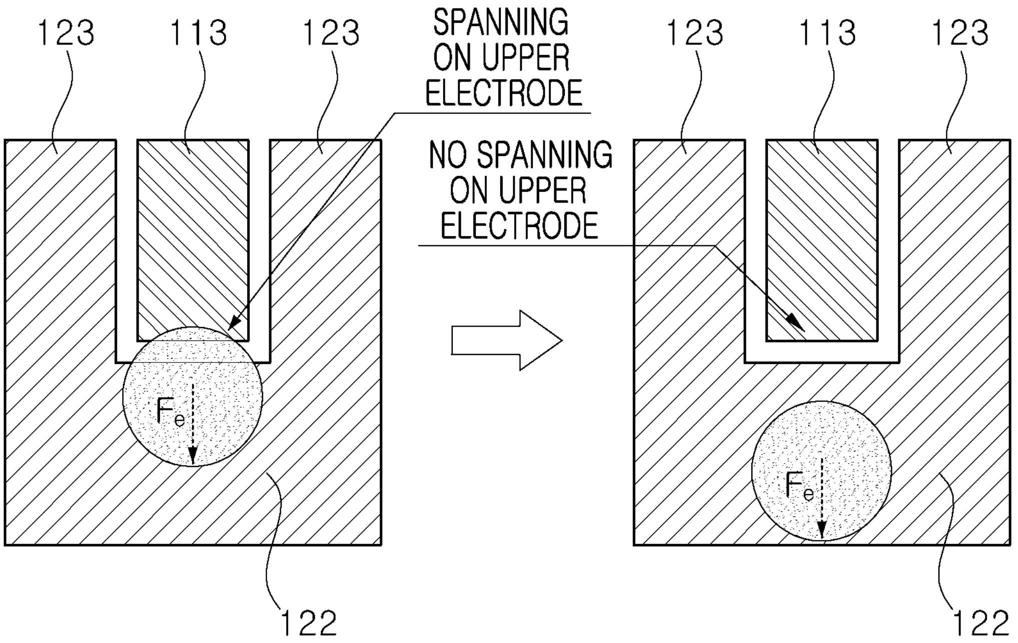
FIGS. 15 and 16 are views illustrating motions of droplets with respect to droplet sizes according to the present disclosure.
Figure 16:
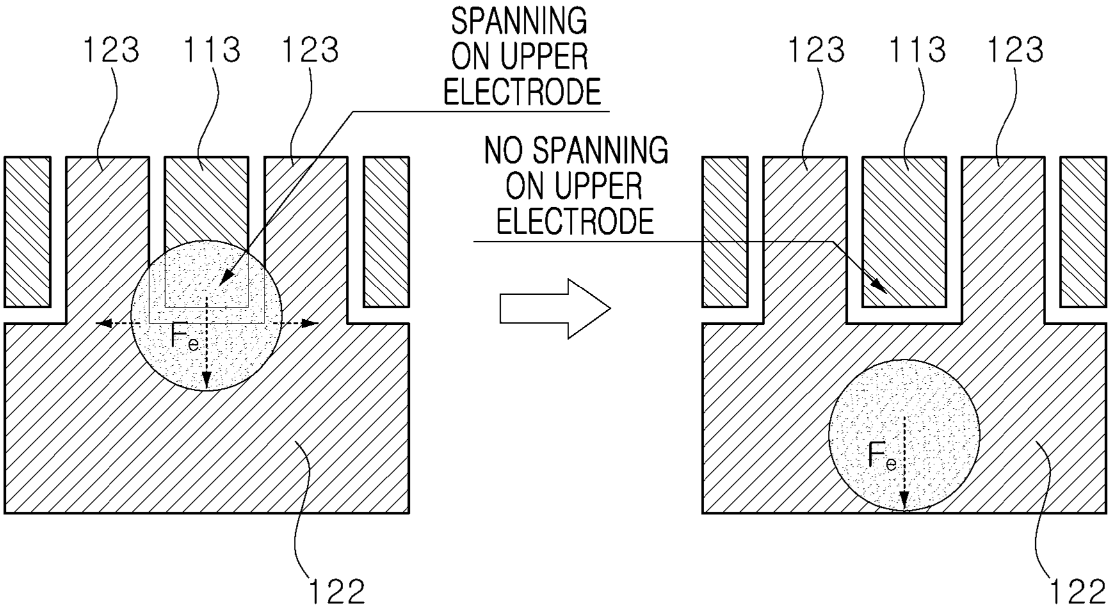

During a process of designing the pattern electrode under this condition with reference to FIG. 15, in which a size of the droplet D spans two or fewer electrodes, and FIG. 16, in which a size of the droplet D spans three or more electrodes, the droplet falls on the second basal pattern electrode 122 without being stuck on the first branch electrode 113 in case that the droplet spans the terminal end of the first branch electrode 113 and the second basal pattern electrode 122.

Table 1 below shows the radii of the droplets with respect to the volumes of the droplets.

TABLE 1

| Water droplet volume µl | Contact angle deg. | Calculated radius mm | Calculated contact radius mm | Actually measured radius mm | Expected radius mm | Expected contact radius mm |
|---|---|---|---|---|---|---|
| 5 | 115 | 1.144 | 1.036 | 1.185 | — | 1.074 |
| | 75 | 1.567 | 1.514 | — | 1.624 | 1.568 |
| | 180 | 1.061 | — | — | | — |
| 4.2 (Raindrop) | 115 | 1.079 | 0.978 | — | 1.126 | 1.021 |
| | 75 | 1.479 | 1.428 | — | 1.543 | 1.491 |
| | 180 | 1.001 | 0.874 | — | — | — |
| 3 | 115 | 0.965 | 1.277 | 0.995 | — | 0.902 |
| | 75 | 1.322 | — | — | 1.363 | 1.317 |
| | 180 | 0.895 | 0.606 | — | — | — |
| 1 | 115 | 0.669 | 0.885 | 0.660 | — | 0.598 |
| | 75 | 0.916 | — | — | 0.904 | 0.874 |
| | 180 | 0.620 | 0.354 | — | — | — |
| 0.2 | 115 | 0.391 | 0.518 | — | 0.363 | 0.329 |
| | 75 | 0.536 | — | — | 0.497 | 0.480 |
| | 180 | 0.363 | 0.244 | — | — | — |
| 0.065 (Drizzle) | 115 | 0.269 | 0.356 | — | 0.249 | 0.226 |
| | 75 | 0.368 | — | — | 0.342 | 0.330 |
| | 180 | 0.249 | 0.096 | — | — | — |
| 0.004 (Fog particle) | 115 | 0.106 | 0.141 | — | 0.098 | 0.089 |
| | 75 | 0.145 | — | — | 0.135 | 0.130 |
| | 180 | 0.098 | — | — | — | — |

More specifically, with reference to Table 1, on a surface having a contact angle of 115 degrees, a minimum volume of a droplet, which does not naturally slide, is 3 µl. In the present disclosure, a range of a droplet to be removed is 0.2 µl to 3 µl.

Figure 17:
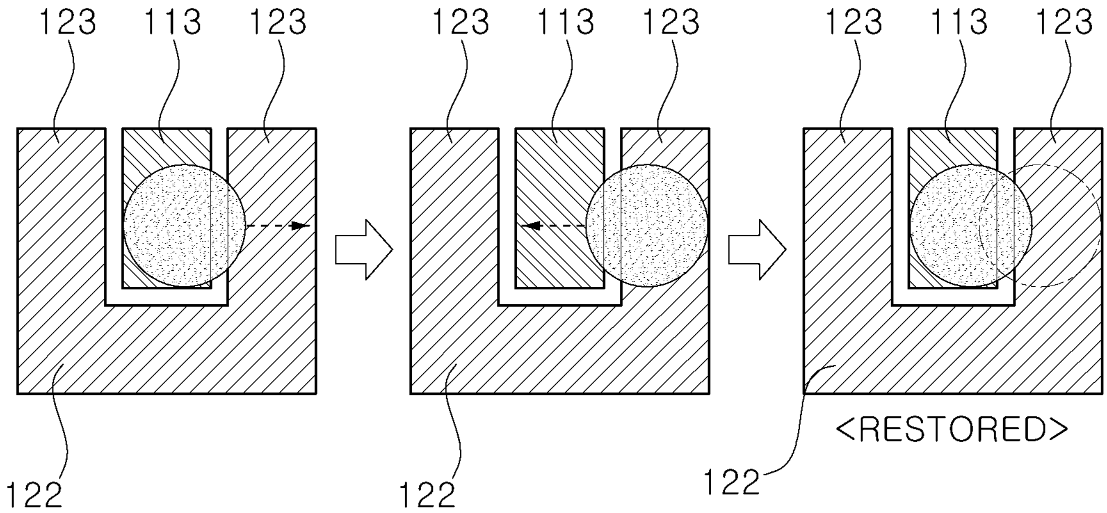
FIGS. 17, 18, and 19 are views for explaining motions of droplets in accordance with pattern shapes.

With reference to FIG. 17, a range of the diameter $\Phi_d$ of the droplet is as follows.

$$0.658\text{~}0.782\text{ mm}\leq\Phi_d\leq1.748\text{~}1.93\text{ mm}$$

Because $W_{2b}+G_{1b}>\Phi_d$ needs to be satisfied, $W_{2b}+G_{1b}$ needs to be larger than a maximum value of $\Phi_d$, and thus a result of $W_{2b}+G_{1b}>1.93$ mm may be derived.

As described above, there have been derived the condition of the width of the second basal pattern electrode 122 and the interval between the second basal pattern electrode 122 and the first branch electrode 113 for preventing the stagnation of the droplet at the lower side.

Next, whether the droplet stagnates at the lower side in accordance with shapes of the branch electrodes will be described.

Figure 18:
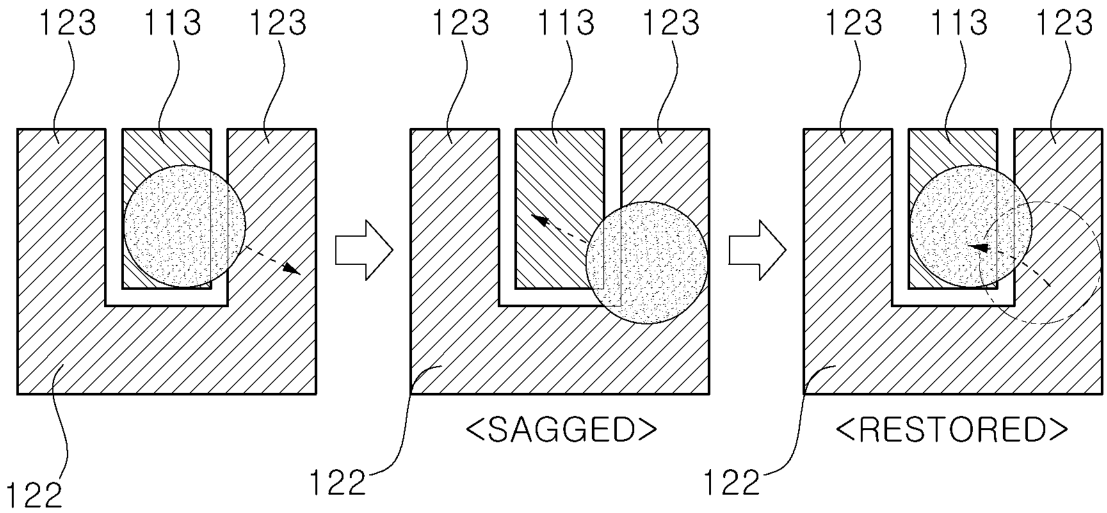
Figure 19:
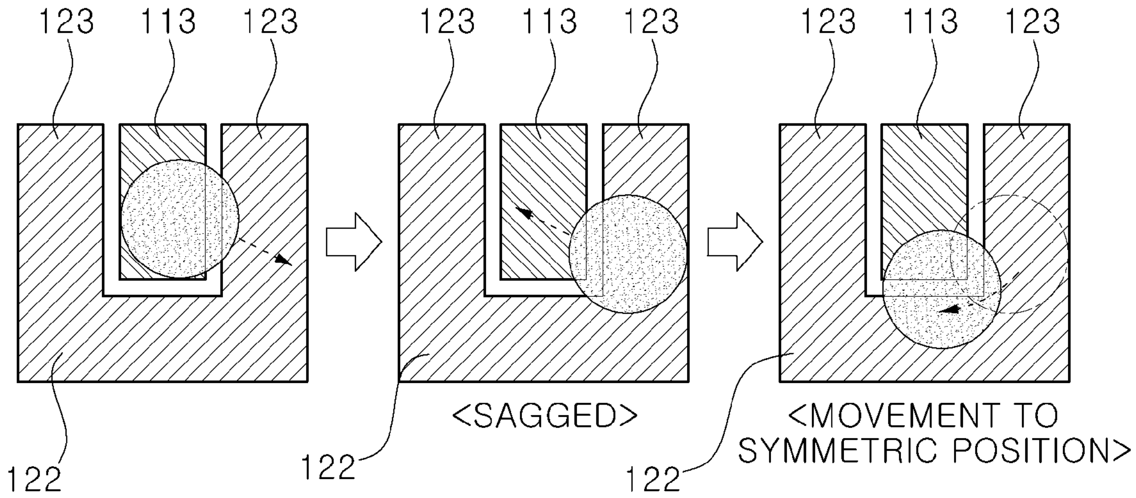

FIGS. 17 to 19 are views for explaining motions of droplets in accordance with pattern shapes.

The branch pattern in the above-mentioned embodiment has the end having a straight shape. Because of an angled shape of an edge of the terminal end, when the droplet reaches the edge of the terminal end, as illustrated, the droplet is restored to the end of the first branch electrode 113 or repeatedly moves while moving to a position at which a symmetric ratio between the first branch electrode 113 and the second branch electrode 123 is uniform.

In case that the droplet cannot depart from the first branch electrode 113 even when intermittently sagging occurs, the motion identical to the above-mentioned motion occurs.

The motions in FIGS. 17 and 18 show highest frequencies, but it is difficult to specify a position of the droplet because of diversities of motion aspects.

Therefore, the present disclosure additionally proposes an application example in which a shape of the terminal end of the first branch electrode 113 is changed.

Figure 24:
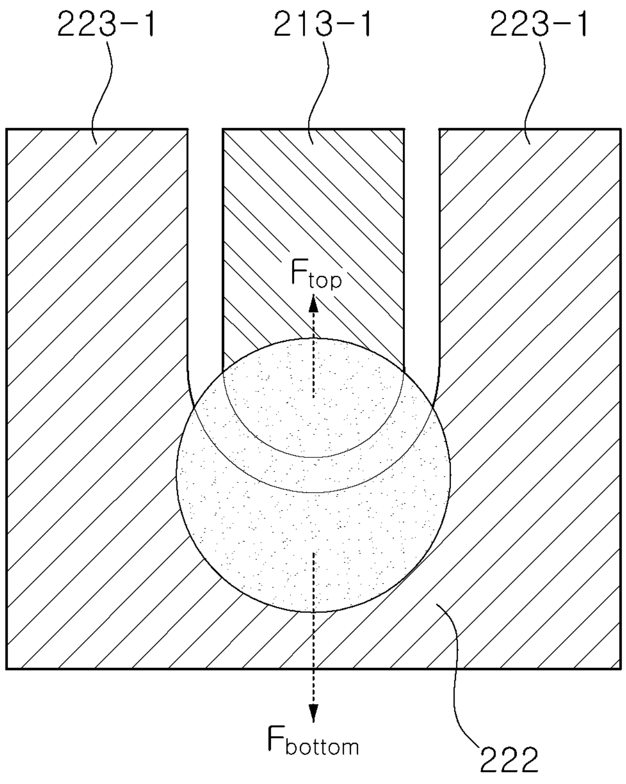
FIGS. 24 and 25 are views for more specifically explaining the example in FIG. 20.
Figure 25:
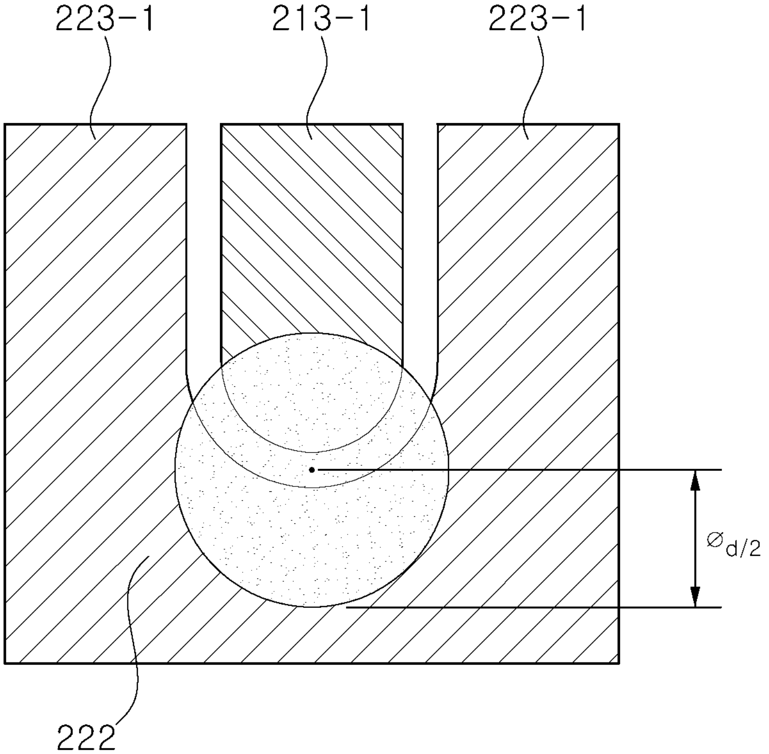
Figure 26:
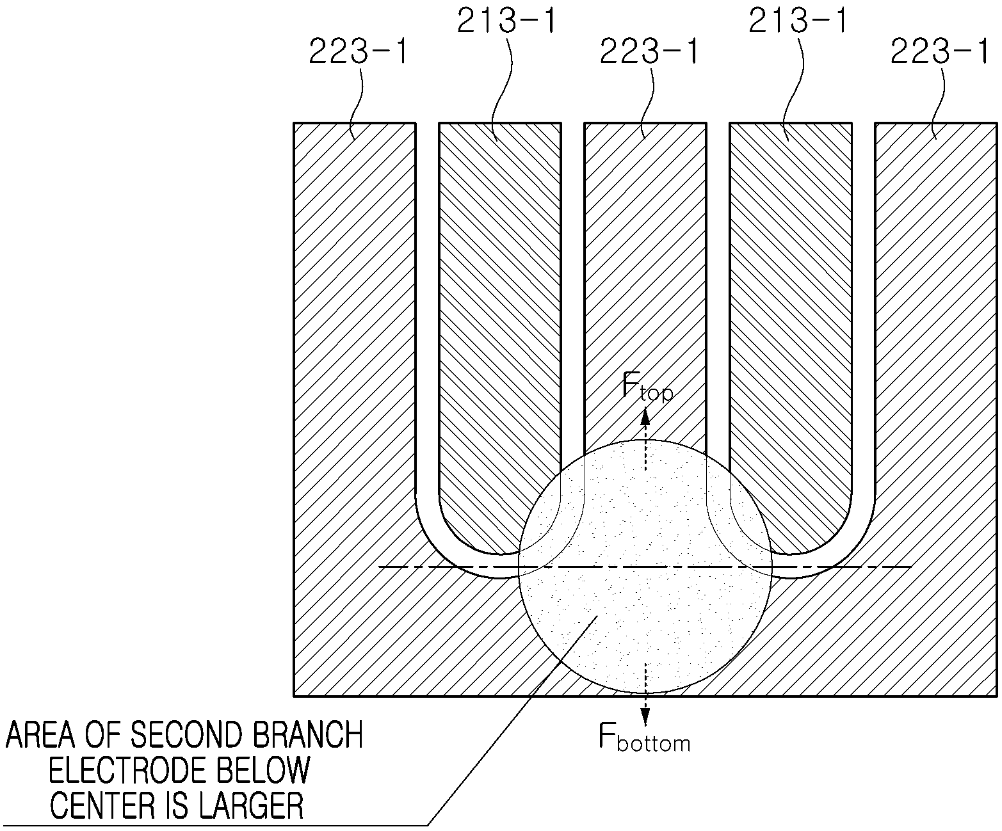
FIGS. 26, 27, 28, and 29 are views respectively illustrating other motions of the droplets in the application examples in FIGS. 20 to 23.
Figure 27:
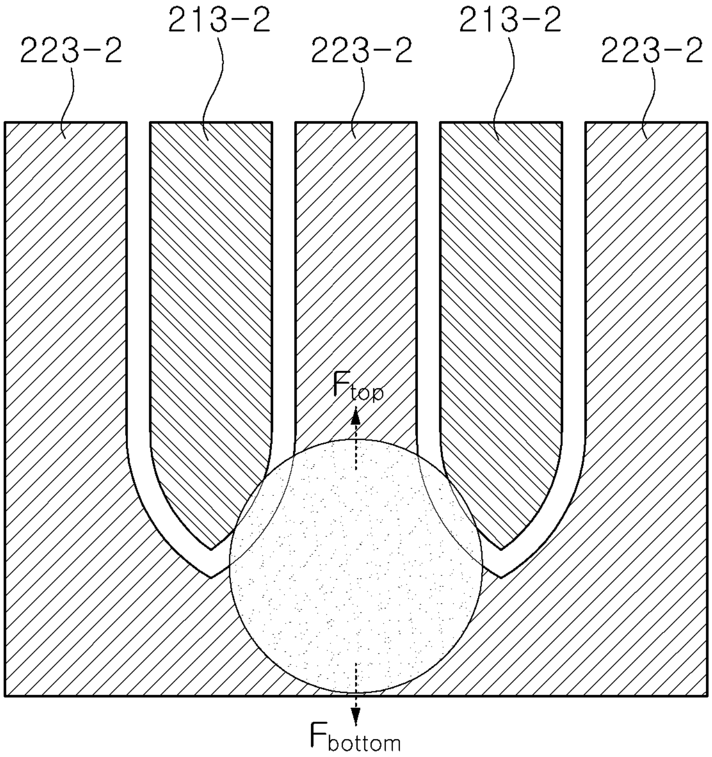
Figure 28:
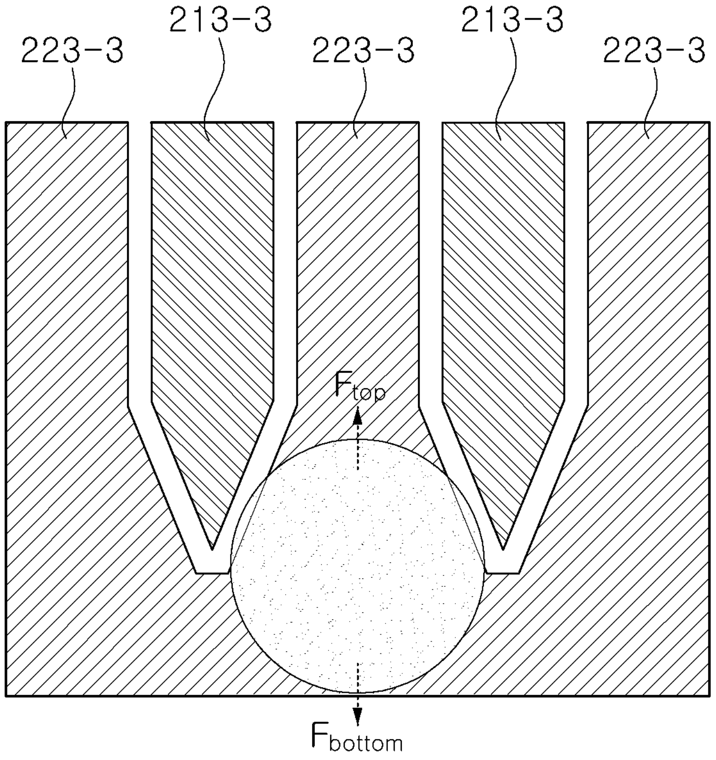
Figure 29:
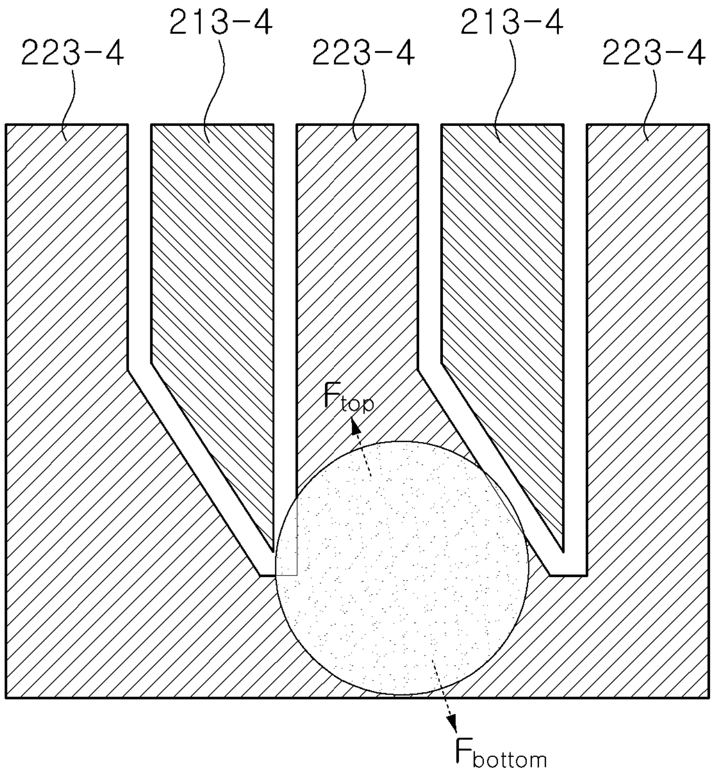
Figure 30:
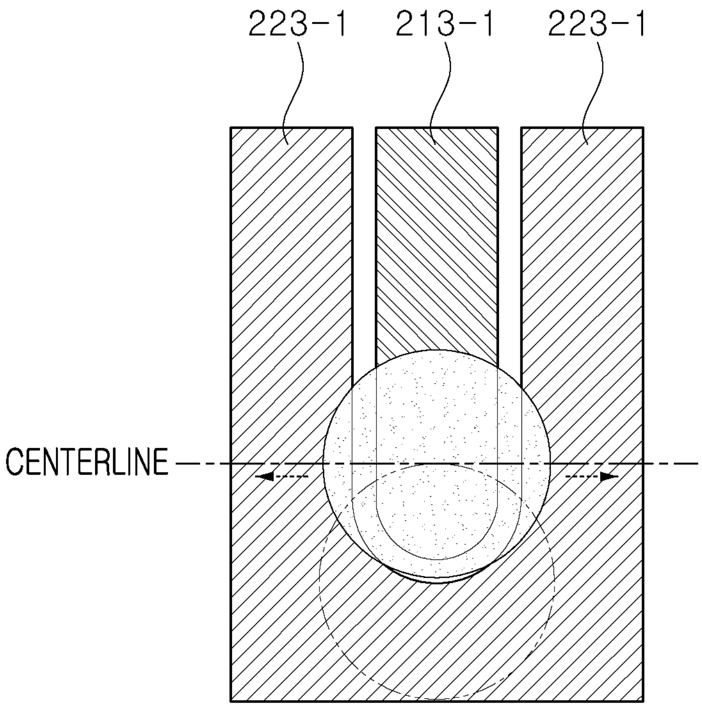
FIGS. 30, 31, 32, and 33 are views respectively illustrating still other motions of the droplets in the application examples in FIGS. 20 to 23.
Figure 31:
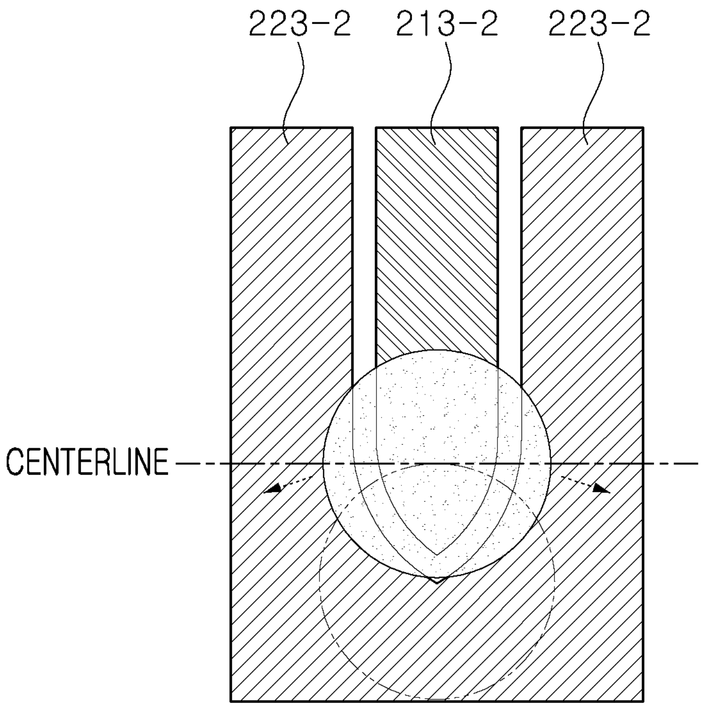
Figure 32:
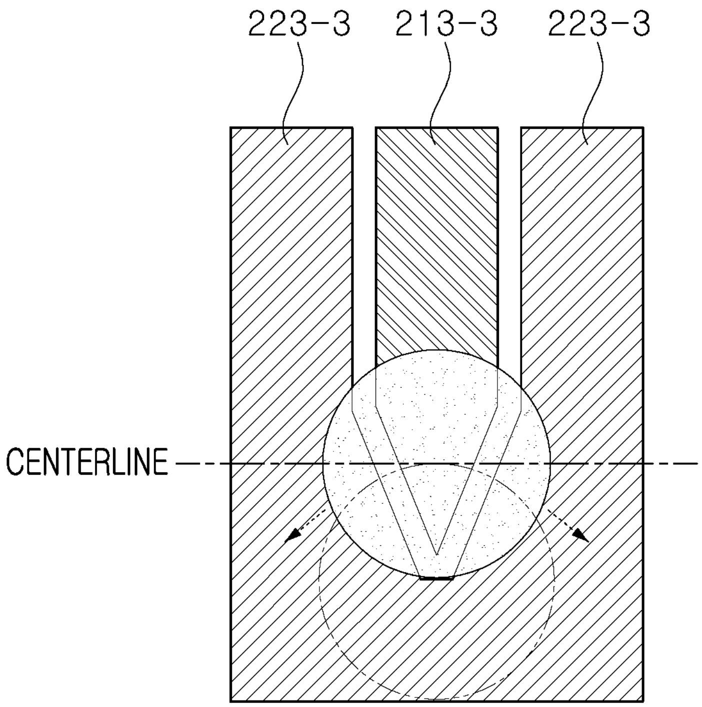
Figure 33:
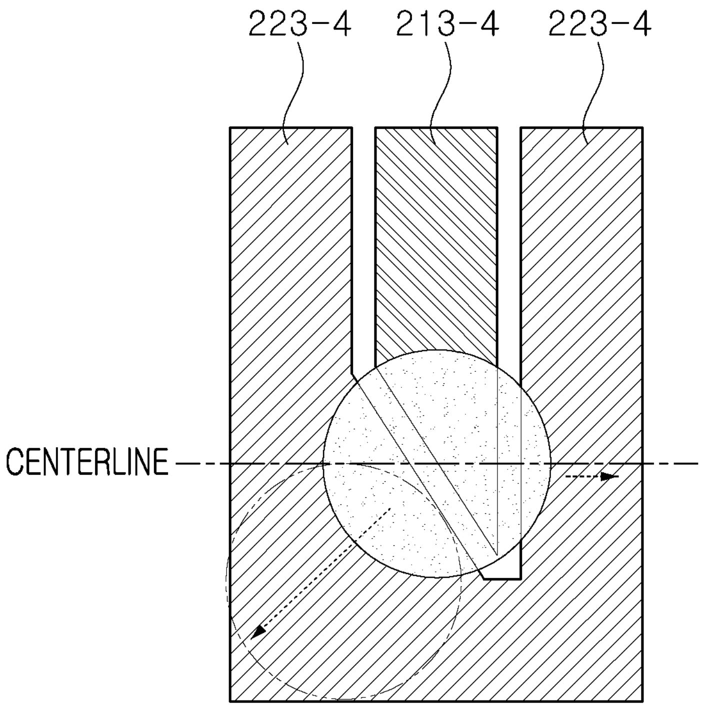

FIGS. 20 to 23 are views illustrating partial portions of application examples of the pattern structure of the electrowetting device of the present disclosure. Further, FIGS. 24 and 25 are views for more specifically explaining the example in FIG. 20.

The terminal end of each of the first branch electrodes has a width that decreases toward the end thereof.

Figure 20:
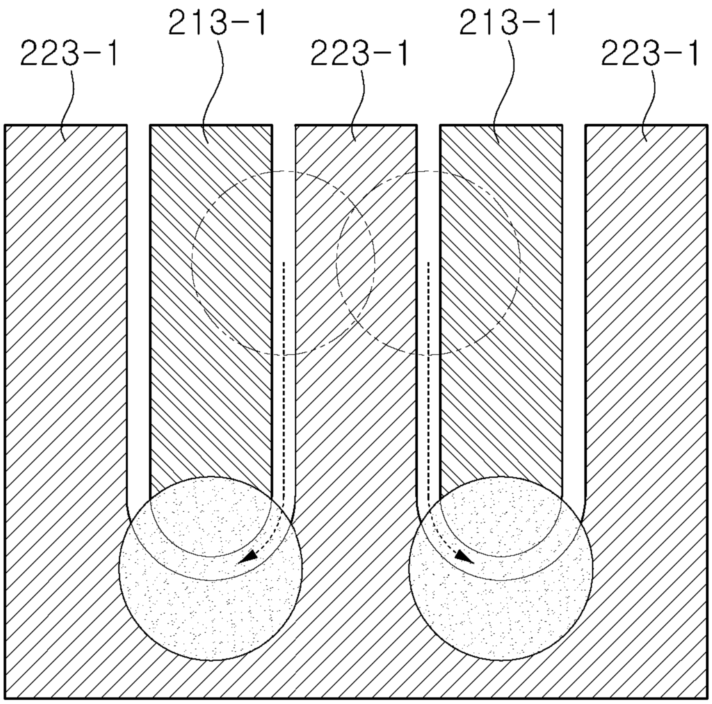
FIGS. 20, 21, 22, and 23 are views illustrating partial portions of application examples of the pattern structure of the electrowetting device of the present disclosure.
Figure 21:
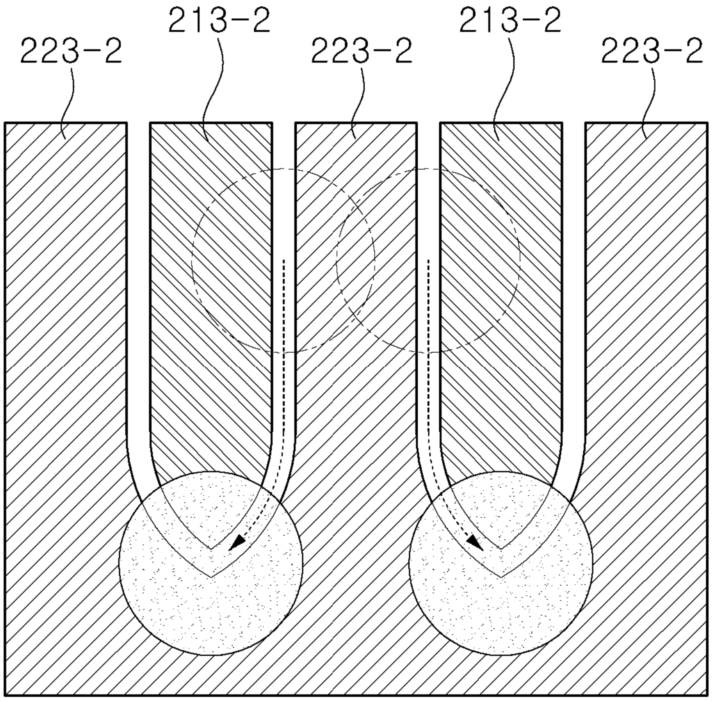

A terminal end of a first branch electrode 213-1 in FIG. 20 has a shape convexly rounded toward the second basal pattern electrode. A terminal end of a first branch electrode 213-2 in FIG. 21 has a shape in which two curved lines extending from two opposite ends are connected to each other. That is, the shape has a curved portion.

Figure 22:
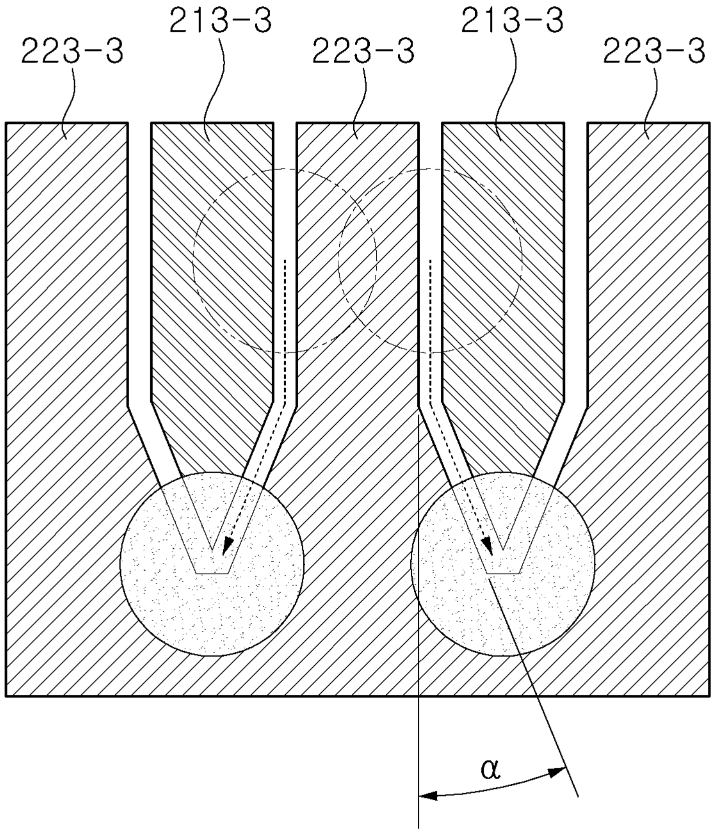
Figure 23:
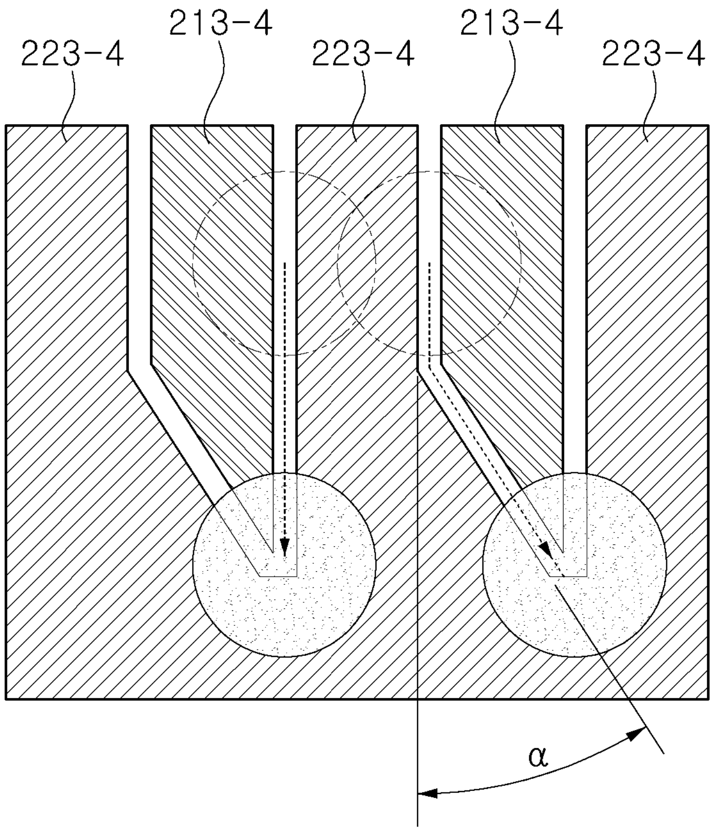

The terminal end of each of the first branch electrodes in FIGS. 22 and 23 has an inclined pointy shape. A terminal end of a first branch electrode 213-3 in FIG. 22 has a symmetric shape, and a terminal end of a first branch electrode 213-4 in FIG. 23 has an asymmetric shape. That is, the shape has a cutting-edge portion.

As illustrated in FIGS. 24 and 25, the shape of the terminal end of each of the first branch electrode may guide the droplet to a particular position, i.e., the terminal end or the end center of the first branch electrode.

In addition, when the droplet reaches the position of the end center of the first branch electrode, an area of the droplet, which spans the first branch electrode and the second basal pattern electrode at the lower side, has an asymmetric shape, such that a higher electrical attractive force is applied to the droplet toward a second branch electrode 223-1, 223-2, 223-4, or 223-4.

FIGS. 26 to 29 are views illustrating large droplets when the sizes of the droplets span three or more electrodes in the application examples in FIGS. 20 to 23.

In case that the droplet slides along the second branch electrode 223-1, 223-2, 223-3, or 223-4, the droplet receives a higher electrical attractive force downward because the area of the second branch electrode 223-1, 223-2, 223-3, or 223-4 on which the droplet is positioned in the upward/downward direction is larger at the position of the droplet that reaches the end.

FIGS. 30 to 33 are views illustrating still another motion of the large droplets when the sizes of the droplets span three or more electrodes in the application examples in FIGS. 20 to 23. That is, this case corresponds to a case in which the droplet slides along the first branch electrode.

At the positions of the droplets that reach the ends, directions of forces vary depending on the distribution of areas of the first branch electrodes 213-1, 213-2, 213-3, and 213-4 and the second branch electrode 223-1, 223-2, 223-3, and 223-4 on which the droplets are placed.

That is, based on a horizontal centerline of the droplet, an area of each of the second branch electrodes 223-1, 223-2, 223-3, and 223-4 disposed below the horizontal centerline is designed to be larger than an area disposed above the horizontal centerline, such that the droplet may receive a higher electrical attractive force downward.

Figure 34:
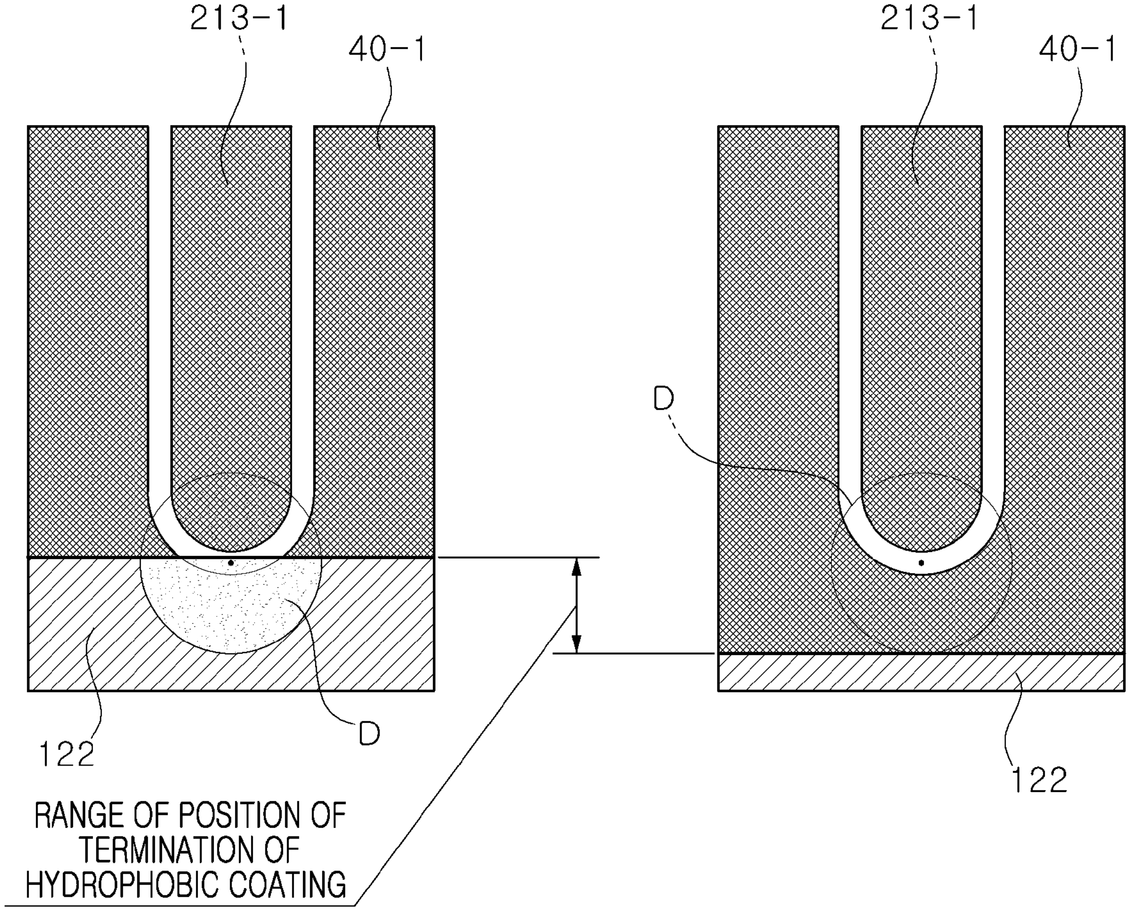
FIG. 34 is a view illustrating an additional application example of the pattern shape in FIG. 20.

Next, FIG. 34 is a view illustrating an additional application example of the pattern shape in FIG. 20.

In the related art, a hydrophobic coating layer is applied to a glass front surface of an electrowetting glass so that the electrowetting glass has a contact angle of 110 degrees or more at all positions. In contrast, in the present disclosure, a hydrophobic coating is excluded at a particular position, such that the droplet is moved to a particular position by an attractive force generated by a difference in solid surface energy.

The exclusion of the hydrophobic coating may be performed by performing masking during a coating process. In the case of wet coating using an inkjet method, hydrophobic coating may be applied to a selected position by using a process device.

In the related art, it is difficult to specify a position of a droplet on an end structure of an electrode pattern, which restricts an effect even when the hydrophobic coating is applied selectively. In contrast, in case that as illustrated in FIGS. 20 to 23, the pattern structure using the curved line and the gradual straight line is applied to the terminal end, the droplet may be guided to the particular position, which may maximize the effect of the selective hydrophobic coating.

That is, the droplet, which is moved by the selective hydrophobic coating completely departs from the basal electrode, such that the droplet does not oscillate, and a situation in which electric charges or ions are moved and concentrated in a fluid is eliminated. Therefore, a surface burnout does not occur.

A position when the droplet D reaches a lowermost end is a point at which a lowermost end of the first branch electrode 213-1 coincides with a center of the droplet.

Therefore, a lower end of hydrophobic coating 40-1 needs to be equal to or lower than the lowermost end of the first branch electrode 213-1. When the droplet reaches the lowermost end, the lower end of the hydrophobic coating 40-1 should not be equal to or lower than the lowermost end of the droplet.

Therefore, a height of the lower end of the hydrophobic coating needs to be equal to or lower than a height of the lowermost end of the first branch electrode 213-1 and needs to be higher than a point spaced apart downward from the lowermost end of the first branch electrode 213-1 at a distance of $\Phi_d/2$.

According to the present disclosure, the above-mentioned dimension and shape of the pattern and the hydrophobic layer may prevent the droplet from stagnating without falling at the terminal end of the pattern, thereby more efficiently improving the self-cleaning performance.

While the present disclosure has been described with reference to the exemplified drawings, it is obvious to those skilled in the art that the present disclosure is not limited to the aforementioned embodiments, and may be variously changed and modified without departing from the spirit and the scope of the present disclosure. Accordingly, the changed or modified examples belong to the claims of the present disclosure and the scope of the present disclosure should be interpreted on the basis of the appended claims.

The invention claimed is:

1. A pattern electrode structure for an electrowetting device, which is laminated between a base material and a dielectric layer of the electrowetting device, the pattern electrode structure comprising:

a plurality of first branch electrodes formed in a direction perpendicular to any plane perpendicular to a plane defined by the pattern electrode structure; and a plurality of basal pattern electrodes formed in an area below lower ends of each of the plurality of first branch electrodes, and connected to an electrode connection portion configured to receive a voltage; and a hydrophobic coating layer laminated on the electrode structure;

wherein the hydrophobic coating layer is partially laminated on the electrode structure;

wherein the plurality of first branch electrodes and the plurality of basal pattern electrodes have different polarities;

wherein a height of a lower end of the hydrophobic coating layer is equal to or lower than a height of a lowermost end of each of the plurality of first branch electrodes, and the height of the lower end of the hydrophobic coating layer is higher than a height of a lowermost end of each of the plurality of basal electrodes; and wherein the hydrophobic coating layer is not formed on the plurality of basal electrodes at a height lower than a predetermined height from the lowermost end of each of the plurality of first branch electrodes.

2. The pattern electrode structure of claim 1, wherein the sum of the interval between each of the plurality of first branch electrodes and each of the plurality of basal pattern electrodes, and the width of each of the plurality of basal pattern electrodes is larger than 1.93 mm.

3. The pattern electrode structure of claim 1, further comprising:

a plurality of second branch electrodes formed alternately with the plurality of first branch electrodes in a width direction of the pattern electrode structure, the plurality of second branch electrodes being different in polarities from the plurality of first branch electrodes.

4. The pattern electrode structure of claim 1, wherein a lower end of each of the plurality of first branch electrodes has a width that decreases toward an end of each of the plurality of first branch electrodes.

5. The pattern electrode structure of claim 4, wherein the lower end of each of the plurality of first branch electrodes includes a curved portion.

6. The pattern electrode structure of claim 4, wherein the lower end of each of the plurality of first branch electrodes includes a cutting-edge portion.

7. The pattern electrode structure of claim 4, wherein a sum of an interval between each of the plurality of first branch electrodes and each of the plurality of basal pattern electrodes, and a width of each of the plurality of basal pattern electrodes is larger than a diameter of a droplet to be removed.

* * * * *